W. V. TURNER.
HIGH SPEED REDUCING VALVE FOR AIR BRAKES.
APPLICATION FILED JAN. 14, 1904.
902,182.
Patented Oct. 27, 1908.
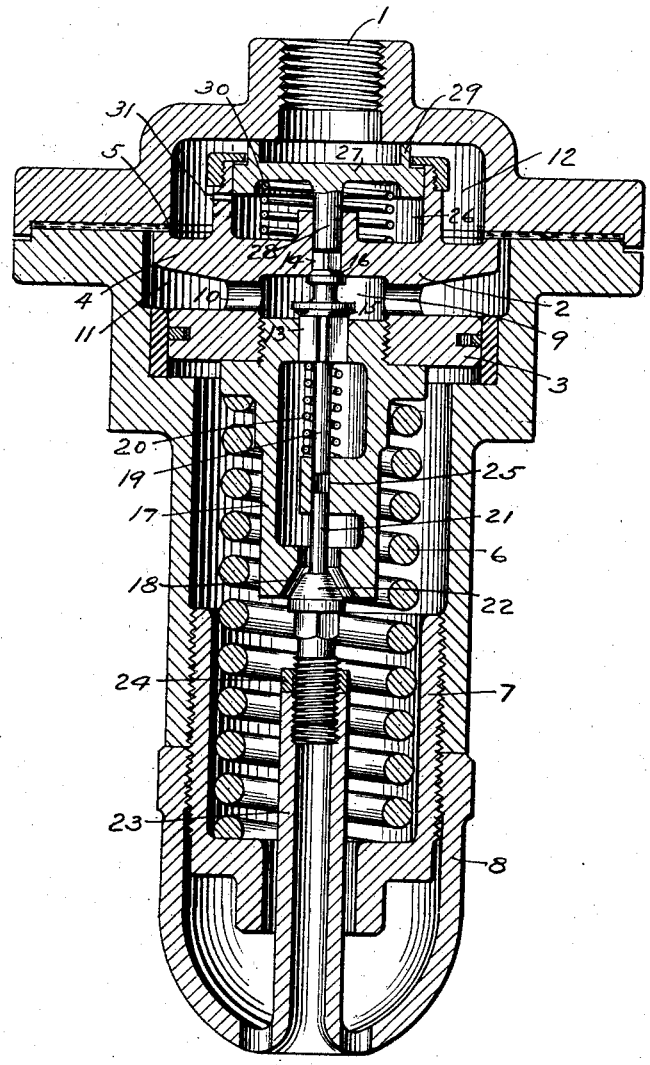
WITNESSES
INVENTOR
Walter V. Turner
By E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

HIGH-SPEED-REDUCING VALVE FOR AIR-BRAKES.

No. 902,182.   Specification of Letters Patent.   Patented Oct. 27, 1908.

Application filed January 14, 1904. Serial No. 188,997.

*To all whom it may concern:*

Be it known that I, WALTER V. TURNER, a citizen of the United States, residing at Wilkinsburg, in the county of Allegheny and State of Pennsylvania, have invented a certain new and useful Improvement in High-Speed-Reducing Valves for Air-Brakes, of which improvement the following is a specification.

This invention relates to fluid pressure brakes, and more particularly to what is known as a high speed reducing valve to be applied to the brake cylinder for limiting the pressure therein to a certain amount in service applications of the brake, and for gradually reducing the pressure therein to this amount in emergency applications.

The pressure usually carried in the high speed brake system is much greater than that previously used in ordinary train service, and in order to prevent such an excessive brake cylinder pressure as to cause a sliding of the wheels when running at slower speeds, a reducing valve has been used for this purpose, such as shown, for instance, in Patent No. 506,185, of Oct. 3, 1893. This reducing valve as heretofore used is adapted to be operated by the sudden rush of air to the brake cylinder in emergency applications of the brake, to its extreme position in which only a small restricted outlet is open to the atmosphere, and to gradually enlarge the size of this outlet port as the device moves under the diminishing of the brake cylinder pressure until it is closed at the predetermined pressure for which the valve is set. The object of this, of course, is to retain the higher pressure in the brake cylinder for a limited period until the speed of the train has been reduced, but one defect of this prior structure is, that in moving to this extreme position having the restricted outlet, the larger sized outlet is open for a moment, during which time some of the pressure which it is desired to retain just at that moment in the brake cylinder escapes to the atmosphere.

My invention is designed to overcome this defect by providing means for momentarily closing the relief or outlet port entirely until the device has reached its extreme position to which it is forced in emergency applications, thereby retaining the entire pressure in the brake cylinder until such time as it is desired to redue the same gradually to the atmosphere on account of the slowing up of the train.

Another important feature of my invention comprises means for securing a quick and positive closing of the reducing valve piston against its seat when the brake cylinder pressure has been reduced to that for which the spring is adjusted and the piston is nearly closed upon its seat.

My invention also comprises certain other improved features of construction, all of which will hereinafter be more fully set forth.

Referring to the accompanying drawing, which shows a sectional view of a valve device embodying my improvement, the opening 1 is adapted to be connected to the brake cylinder in the usual way. Within the casing is the piston 2, which in this particular instance is shown as composed of two heads, 3 and 4, the head 3 forming the piston proper and the head 4 forming a valve adapted to seat against the shoulder and gasket 5 of the casing when held in its normal or closed position by means of the main adjustable spring 6, having adjusting nut 7 and cap nut 8. In the piston 2, between the heads, is formed the chamber 9 having openings 10 leading out to the chamber 11 around the head 4 and adapted to communicate with the chamber 12 in the casing above the valve head when the valve is forced from its seat by pressure from the brake cylinder which enters chamber 12.

The diameter of the piston head 3 is made substantially equal to that portion of the valve head 4, which is exposed to the brake cylinder pressure in chamber 12 when the valve is seated, so that the effective area of the piston subject to the brake cylinder pressure is substantially the same after the piston has moved off its seat as before. Openings 13 and 14 are formed from the chamber 9 through the heads 3 and 4 of the piston, and in these openings are located the oppositely faced valves 15 and 16, one being adapted to be seated when the other is open. The opening 13 leads into a hollow extension 17 of the piston, the lower end of which opens to the atmosphere through a flaring or conical port 18. A stem 19, of valve 15, extends down within the hollow portion 17 of the piston head and is provided with a guide 25 and a spring 20 for normally holding the valve 15 open and the valve 16 closed. The cap nut 8 is provided with a central projection 23 extending up through an opening in the adjusting nut 7 and carries at its upper end a conical head or valve 22, which extends into the conical opening 18 and has a stem 21 engaging the guide 25. The conical head may be screw threaded into the extension 23 and provided with a lock nut 24.

On the upper or valve head 4 of the piston is formed a cylindrical chamber 26 containing a piston 27 having a stem 28 extending down into the opening 14, and an annular flange 29 extending upward to normally bear against the cap of the chamber 12. A light spring 30 normally holds the piston 27 in its upper position and a restricted port 31 establishes communication between chamber 12 and the cylindrical chamber 26 beneath the piston 27.

The operation of this form of my improvement is as follows: When a service application of the brakes is made, the pressure accumulates in the brake cylinder and in chamber 12 only so fast as the air can be admitted through the graduating port of the triple valve. This air, thus admitted from the brake cylinder, acts first upon the piston 27, which may be called the emergency or supplemental piston, causing the spring 30 to yield slightly to provide an adequate opening over the top of the flange 29 and fills the chamber 12 at brake cylinder pressure. At the same time this pressure equalizes into the chamber 26 through the small port 31. This slight movement of the piston 27 is not sufficient to force the valve 16 off its seat against the tension of the spring 20, and there is sufficient lost motion between the stem 28 and the valve 16 to allow for this movement.

The valve head 4 continues to remain seated until the brake cylinder pressure rises above the amount for which the main spring 6 is adjusted, then the main piston moves down sufficiently to open the passage around the valve head 4 and release a part of the brake cylinder pressure to the atmosphere through passages 11, 10, 9, 13 and 18. All the parts carried by the main piston move down together, but this movement is slight, as the port 18 is then open to its maximum extent, so that the stem 19 does not engage the stem 21. In this position the air can escape through the conical opening 18 as rapidly as the same can be charged into the brake cylinder through the service port of the triple valve, so that in service applications the pressure can accumulate in the brake cylinder no higher than that for which the main spring is adjusted.

When the pressure is reduced to the point where the spring forces the valve head 4 very close to its seat 5 it is desirable that there should be a quick and positive closing of the valve to prevent the slow leakage or dribbling out of the brake cylinder pressure to a point somewhat less than that which it is desired to retain, before the piston is seated perfectly tight against its gasket, and this is provided for in my improved construction, as follows: When the valve 4 reaches such close proximity to its seat as to cause a dribbling out of the brake cylinder fluid around the valve head and out through openings 13 and 18 to the atmosphere, the flange 29 of the supplemental piston then makes contact with the cap of the chamber 12, thereby restricting for the moment the supply of fluid under pressure from the brake cylinder to the chamber 12 outside of said flange. This causes a more rapid reduction of the pressure from this annular space of chamber 12 out past the valve head than can be supplied over the annular flange 29 of the supplemental piston, consequently the main spring 6 acts to quickly and positively seat the valve 4 upon its gasket, thus preventing the objectionable slow leakage out past the piston while the spring is gradually forcing said piston to a tight seat against its gasket.

When an emergency application of the brakes is made, and the air is admitted into the brake cylinder with great rapidity, the supplemental piston 27 is immediately pushed down against its spring 30 before the pressure has time to equalize through the small port 31 into the cylinder 26 beneath the piston. In this movement of this piston its stem 28 forces the valve 15 to its seat in the opening 13 and opens valve 16 before the valve head 4 of the main piston leaves its seat, then as the main piston moves down under the rapidly accumulating brake cylinder pressure the outlet 13 is temporarily closed and no escape of brake cylinder pressure will occur until the piston reaches nearly the lower limit of its movement, at which time the stem 21 engages the stem 19 and again opens the valve 15. But at this time, the conical valve opening 18 is almost closed by the conical valve 22, thereby restricting the escape opening to a very small port, which gradually enlarges as the piston moves up by the action of the spring under the reducing brake cylinder pressure until the piston head seats upon its gasket, as before described.

The spring 20 is sufficiently strong to normally hold the valve 15 tightly to its seat at all times except in emergency applications, and thus prevents leakage around the stem 28 and through the opening 14.

It will now be evident that by means of my improved device there will be no loss of air from the brake cylinder during the time that the piston of the reducing valve is moving to its extreme position in emergency applications of the brakes, and also that the piston will be closed to its seat with a quick positive movement when the brake cylinder pressure is reduced to that from which the main spring is adjusted.

Having now described my invention, what I claim as new and desire to secure by Letters Patent is:—

1. A reducing valve device for air brakes, comprising a piston subject to the opposing pressures of the brake cylinder and an adjustable spring for controlling an outlet from the brake cylinder, and means operating in emergency applications of the brakes to temporarily hold said outlet closed during the outward movement of the piston.

2. A reducing valve device for air brakes, comprising a piston subject to the opposing pressures of the brake cylinder and an adjustable spring for controlling an outlet from the brake cylinder, and means operated by a sudden rush of air to the brake cylinder for temporarily closing said outlet independently of the movement of said piston.

3. A reducing valve device for air brakes, comprising a piston subject to the opposing pressures of the brake cylinder and an adjustable spring for controlling an outlet from the brake cylinder, a valve for closing said outlet and a supplemental piston exposed to brake cylinder pressure for closing said valve.

4. A reducing valve device for air brakes, comprising a piston subject to the opposing pressures of the brake cylinder and an adjustable spring for controlling an outlet from the brake cylinder, a valve for closing said outlet, a supplemental piston exposed on one side to brake cylinder pressure for closing said valve, and means for slowly equalizing the pressure to the opposite side of said supplemental piston.

5. A reducing valve device for air brakes, comprising a main piston subject to the opposing pressures of the brake cylinder and spring and having an outlet from the brake cylinder therethrough, and means operated by a sudden rush of air to the brake cylinder for temporarily closing said outlet through the main piston independently of its movement.

6. A reducing valve device for air brakes, comprising a main piston subject to the opposing pressures of the brake cylinder and spring and having an outlet from the brake cylinder therethrough, a valve for closing said outlet passage through the main piston, and a supplemental piston exposed to brake cylinder pressure for temporarily closing said valve.

7. A reducing valve device for air brakes, comprising a piston subject to the opposing pressures of the brake cylinder and an adjustable spring for controlling an outlet from the brake cylinder, means for causing a maximum opening of said outlet upon a short movement of said piston and a minimum opening upon a full movement of the piston, and means operated by a sudden rush of air to the brake cylinder for holding said outlet closed while the piston is making its full movement.

8. A reducing valve device for air brakes, comprising a piston subject to the opposing pressures of the brake cylinder and an adjustable spring for controlling an outlet from the brake cylinder, means for causing a maximum opening of said outlet upon a short movement of said piston and a minimum opening upon a full movement of the piston, a supplemental piston and valve operating upon an emergency application of the brakes to close said outlet, and means operated by the extreme or full movement of the main piston for again opening said valve.

9. A reducing valve device, comprising a casing having a piston provided with a valve head seating against said casing and exposed to brake cylinder pressure, an outlet passage opening through the piston beneath the valve head, and means for causing a maximum opening of said outlet passage upon a partial movement of the piston and a minimum opening upon a full movement of said piston.

10. A reducing valve device, comprising a casing having a piston provided with a valve head seating against said casing and exposed to brake cylinder pressure, an outlet passage opening beneath said valve head, and means operating in emergency applications for temporarily closing said outlet passage.

11. A reducing valve device, comprising a casing having a piston provided with a valve head seating against said casing and exposed to brake cylinder pressure, an outlet passage opening beneath said valve head, means for varying the size of the outlet opening as the piston moves to its extreme position, and means operated by a sudden rush of air to the brake cylinder for temporarily closing said outlet.

12. A reducing valve device, comprising a casing having a piston provided with a valve head seating against said casing and exposed to brake cylinder pressure, an outlet passage opening through the piston beneath the valve head, means for varying the size of the outlet opening as the piston moves to its extreme position, and means operated by a sudden rush of air to the brake cylinder for temporarily closing said outlet.

13. A pressure reducing valve, comprising a casing having a piston seated against said casing and exposed on one side to brake cylinder pressure, an outlet opening through said piston, a valve for closing said outlet and a supplemental piston mounted on the main piston for temporarily closing said valve in emergency applications of the brakes.

14. A reducing valve device, comprising a casing having a piston normally seated against a shoulder of said casing and exposed on one side to brake cylinder pressure for controlling an outlet from the brake cylinder, and means for restricting the supply of air from the brake cylinder to said piston when the piston is almost closed against its seat.

15. A reducing valve device comprising a casing having a piston subject to the opposing pressures of the brake cylinder and a spring for controlling an outlet from the brake cylinder, the piston being normally seated by the said spring, and means carried by the piston for restricting the supply of air from the brake cylinder to said piston when the spring has nearly closed the same upon its seat.

16. A reducing valve device, comprising a casing having a piston normally seated against the casing and subject to the opposing pressures of the brake cylinder and a spring, an outlet for the brake cylinder below said seat and controlled by the movement of the piston, and means carried by the main piston for restricting the supply of air from the brake cylinder to a portion of said piston area when the spring has nearly closed the piston upon its seat.

17. A reducing valve device, comprising a casing having a piston normally seated against the casing and subject to the opposing pressures of the brake cylinder and a spring, an outlet for the brake cylinder below said seat and controlled by the movement of the piston, a valve in said outlet, a supplemental piston carried by the main piston for temporarily closing said valve in emergency applications, and means carried by said supplemental piston for restricting the supply of air from the brake cylinder to the main piston when the said main piston is nearly closed upon its seat.

18. A reducing valve device for air brakes, comprising a piston subject to the opposing forces of the brake cylinder pressure and an adjustable spring and adapted to move out against said spring and open an outlet from the brake cylinder when the pressure exceeds a predetermined degree, and means operated by a rapid rise in brake cylinder pressure in emergency applications to hold said outlet closed.

19. In a fluid pressure brake, the combination with a brake cylinder, of a blow down valve mechanism controlled by the opposing forces of an adjustable spring and the brake cylinder pressure, and means operating in emergency applications to close the outlet from the brake cylinder through the blow down valve mechanism.

20. In a fluid pressure brake, the combination with a brake cylinder, of a blow down valve mechanism controlled by the opposing forces of an adjustable spring and the brake cylinder pressure, and means operated by the rapid rise in brake cylinder pressure in emergency applications to close the outlet from the brake cylinder through the blow down valve mechanism.

In testimony whereof I have hereunto set my hand.

WALTER V. TURNER.

Witnesses:
R. F. EMERY,
JAS. B. MACDONALD,